(12) United States Patent
Newman, Jr.

(10) Patent No.: US 7,868,478 B2
(45) Date of Patent: Jan. 11, 2011

(54) ELECTRONIC POWER STABILIZER

(76) Inventor: Robert Charles Newman, Jr., 2955 Main Rd. East, Emmaus, PA (US) 18049

( * ) Notice: Subject to any disclaimer, the term of this patent is extended or adjusted under 35 U.S.C. 154(b) by 153 days.

(21) Appl. No.: 12/317,133

(22) Filed: Dec. 19, 2008

(65) Prior Publication Data
US 2010/0156181 A1     Jun. 24, 2010

(51) Int. Cl.
*B60L 1/00*     (2006.01)
(52) U.S. Cl. .................................................. 307/9.1
(58) Field of Classification Search ................ 307/9.1
See application file for complete search history.

(56) References Cited

U.S. PATENT DOCUMENTS 7,057,376 B2 *  6/2006  Cook et al. .................. 323/207

2004/0201931 A1 * 10/2004  Korcharz et al. .............. 361/18

* cited by examiner

*Primary Examiner*—Robert L. Deberadinis

(57) ABSTRACT

An electronic control system having a boost converter circuit with an input for receiving a first DC voltage from a source of power and an output for delivering a second DC voltage to a load. The boost converter includes a main power transistor and a primary control circuit for providing a first control signal to control the main power transistor. The first control signal from the primary control circuit effects the maximum allowable current flowing in the main power transistor. The system includes a secondary control circuit having a temperature detector that provides a second control signal for overriding the first control signal of the primary control circuit. The temperature detector is mounted in thermal relation to the main power transistor, and the secondary control circuit is capable of reducing the maximum current flowing in the main power transistor based on a third signal received from the temperature detector.

18 Claims, 4 Drawing Sheets

ELECTRONIC POWER STABILIZER

BACKGROUND OF THE INVENTION

In the field of electronics for vehicle applications an improvement is needed to maintain the operation of various electronics during the transition event of engine starting. Typical prior art power systems would ensure electronic subsystems are maintained in an off or standby condition during engine starting. This was done to ensure that voltage transients from the engine starter do not adversely affect sensitive electronic components. Additionally, during engine starting, via the engine electric starter, the available battery voltage would fall significantly. This reduction in battery voltage is likely to cause connected electronics to go through a reset or start-up condition if powered during engine starting. Additionally, when the engine starter is de-energized at the end of the cranking cycle it is likely that stored energy in the magnetic field of the starter motor will release voltage transients on the associated bus voltage supply. The voltage transients from the electric starter motor may damage electronics that are connected and powered by the associated bus voltage supply.

The system described in this disclosure resolves the issues resulting from bus voltage supply reduction as well as voltage transients during engine cranking. The system of this invention allows electronic equipment to be safely utilized and operational during engine cranking. Additionally, the system described eliminates the need for a back-up or standby battery that typically would be used to separately power typical electronic equipment during engine starting.

Traditional vehicle power supply systems utilized on general aviation aircraft, automobiles and boats often consists of a twelve volt lead-acid storage battery and an engine driven alternator configured to produce a dc voltage through a series of rectifiers. Electrical power is provided to the vehicle system electronics and other electrical loads through a bus system of circuit breakers or fuses, wires, switches and relays. During normal vehicle operation the bus supply system provides power at a nominal bus voltage to the connected electrical loads. When the vehicle engine is not running, no power is produced by the vehicle alternator; therefore, all electrical loads are powered by the storage battery. Typically, this battery will have a nominal voltage of twelve volts dc and will have a reduced voltage as the battery is discharged by the connected loads. The typical lead-acid battery will deliver energy to the connected loads until it is exhausted or until the electrical loads stop requiring energy. Some electronic loads such as radios or GPS navigation systems require ten volts or more to remain operational. If the supplied battery voltage falls below this level the electronics will automatically shut off.

The storage battery used in this type of system is recharged by the engine driven alternator. When the engine is operational the attached alternator produces electrical power, typically at a voltage of between thirteen to fourteen volts dc. This voltage is sufficiently high to recharge the associated vehicle storage battery as well as operate the electrical loads connected to the bus supply system.

One of the associated electrical loads on a typical vehicle electrical system is an electric starter used to start the associated engine. The electric starter is typically a heavy duty DC motor which is intermittently connected by a gearing mechanism to the engine flywheel. During engine starting, the starter motor is operated and the gearing mechanism engages the motor to the engine causing the engine crankshaft to spin and the engine to start. This process is often referred to as engine cranking. During engine cranking the DC motor based electric starter may draw hundreds of amps of current to cause the engine crankshaft to spin at a sufficiently high speed to enable engine starting. The high current required during this starting phase of operation comes from the lead-acid storage battery in the vehicle. This high starting current causes the battery voltage to drop considerably. The resistance of various elements in the bus supply system are subject to the high starter current and thereby have an associated voltage drop as dictated by ohms law, $V=I*R$. The voltage drop in the system is equal to the product of the current and the associated resistance. Typically, the battery internal resistance, the supply cable resistance and the main starter contactor resistance all add to a total resistance through which the starter current must flow. In a general aviation aircraft there often is a master contactor as well that the starter current must flow through. As an example, if the total system resistance had a value of twenty milliohms and the starter current where two hundred amps then a system voltage drop of four volts could be expected. This voltage drop of four volts would be subtracted from the system bus supply voltage, thereby resulting in an effective supply voltage of about eight volts. During the engine cranking period the reduced supply voltage, in this example eight volts, would be provided to all connected and powered electrical loads.

At the end of the engine cranking period another electrical phenomena occurs on the power bus supply. The large current flowing through the system may generate a high voltage transient as the current through the starter is discontinued. The collapsing magnetic field in the starter motor will generate voltage transients. During the time period when the starter contactor is becoming non-conductive, those transients will be coupled to the power bus supply. Additionally, the power bus supply wiring will have an associated wiring inductance. The rapid change in starter current during the cranking period will also generate a voltage transient due to the changing current in the power bus supply wiring due to the wire inductance. These voltage transients will be applied to all connected electrical loads in the system.

During the engine cranking period the reduced supply voltage has various effects on the connected electrical loads. Electrical loads such as incandescent light bulbs will operate at a reduced wattage and appear dimmer than normal. Electrical loads such as DC motors will tend to operate at a slower speed. Electrical loads with electronic components, however, may have a different reaction to the reduced bus supply voltage. Often electronic loads will have a drop-out voltage, below which they will stop operating. Typically, electronic equipment designed for operation on a nominal twelve volt bus system will operate normally down to ten volts, below which they turn off. The turn off below ten volts may be associated with a long restart time after the bus voltage is restored to a value above the drop-out voltage. In general aviation applications this time period may be on the order of minutes and may be highly undesirable.

In general aviation aircraft there are a number of electrical loads which are preferably operational before, during, and after engine cranking. For example an electronic engine monitoring system that displays engine rpm and engine oil pressure would preferably be fully operational through these stages of engine operation. Unfortunately, many engine monitor systems have microprocessors and software based operating systems that can take minutes to boot-up upon the application of power above the drop-out voltage level. Starting an aircraft engine without immediate knowledge of oil pressure is highly undesirable.

Another electronic system that is adversely affected by low bus supply voltage is general aviation GPS systems. These systems typically require a few minutes to boot-up and acquire adequate satellite coverage to allow for proper navigation. Additionally, many GPS systems include user programming memory for active flight plan storage. The active flight plan is stored in volatile memory and subsequently erased during power down conditions. It is highly desirable to have the GPS system up and running prior to engine starting, particularly to provide the user an opportunity to make flight plan changes in the GPS memory without wasting fuel running the engine. However, unless an alternate source of power is available, the GPS will go off during engine cranking, thereby loosing active flight plan information.

The system of the invention allows electronic equipment to be operated from the vehicle bus supply through all phases of engine cranking by boosting the equipment supply voltage when necessary (ie. during engine cranking). The system may be used to raise equipment supply voltage back to a nominal voltage of approximately twelve volts even when the battery voltage falls to approximately four volts. The system of the invention may additionally include transient voltage suppression means such as MOVs or transorbs to absorb potentially harmful voltage transients.

BRIEF DESCRIPTION OF THE DRAWINGS

The invention will now be described in greater detail in the following detailed description with reference to the drawings in which.

SUMMARY OF THE INVENTION

An object of the invention is to provide an electronic control system that converts an input voltage on a DC power bus into an output DC voltage with a converter circuit having a power transistor and a primary control circuit and a secondary control circuit and temperature detector. The primary control circuit may control the conductivity of the power transistor. The temperature detector is connected to the secondary control circuit and provides signals which may be used to override the primary control circuit's effect on the power transistor.

Another object of the invention is to provide an electronic control system that is connectable to a power bus having a variable voltage. The power bus may be supplied by two power sources that have different supply voltages. The electronic control system includes a boost converter circuit connected to the power bus. The boost converter circuit provides an output voltage substantially equal to the voltage supplied by the power source with the higher voltage.

A further objective of the invention is to provide an electronic control system having a power converter circuit for receiving a variable DC voltage from a power source and providing a substantially fixed DC output voltage to a load. The power converter includes a power transistor and a control circuit that causes the transistor to be operated over a range of duty cycles. The power converter also includes a power supply for powering the control circuit. The power supply is positively responsive to the magnitude of the DC output voltage and inversely responsive to the magnitude of the DC load current.

DETAILED DESCRIPTION OF THE INVENTION

Figure 1:
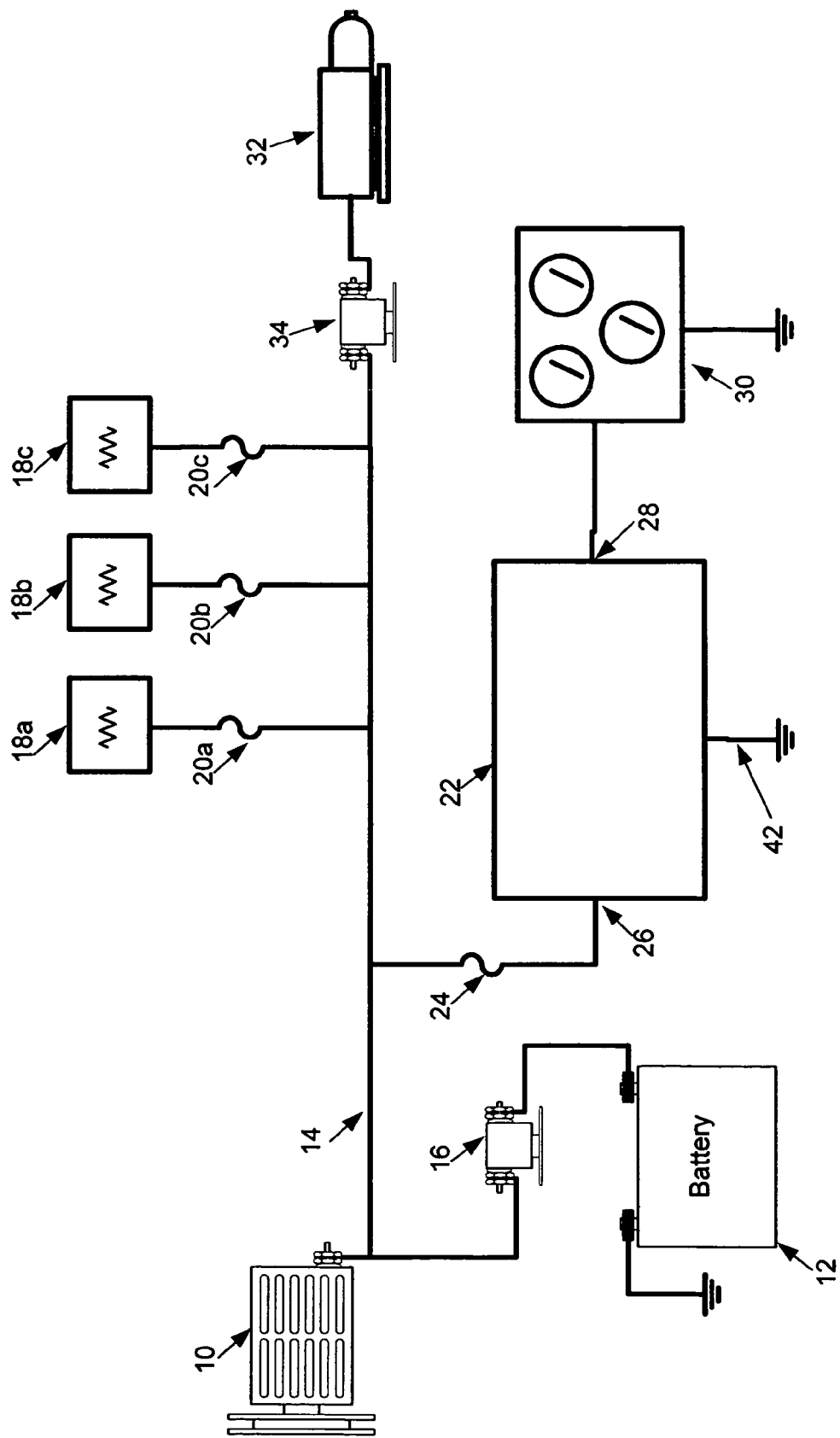
FIG. 1 is a block diagram of vehicle electrical system.

FIG. 1 shows an exemplar vehicle electrical system including the device of the invention. In this example the storage battery 12 has a nominal voltage of twelve volts. The system has a separate power source such as alternator 10 for supplying power to the vehicle electrical system. The alternator is set to regulate the system voltage at approximately fourteen volts. However, the alternator 10 may be comprised of any suitable separate power source regardless of generating technology. Alternator 10 may be a traditional DC generator or an alternator with diode rectification for providing a DC output voltage. Alternatively, alternator 10 may be replaced with any separate source of DC power. Alternator 10 and storage battery 12 are connected to form the power bus 14 by a main supply cable. Storage battery 12 may be connected to power bus 14 through master contactor 16. Example electrical loads 18a,b,c receive electrical power from the power bus through fuses 20a,b,c. Electrical loads 18a,b,c may be lighting loads, motor loads, or electronic loads or any suitable electrical load requiring electrical power from the vehicle electrical system. These electrical loads will have power available from storage battery 12 whenever master contactor 16 is energized. Power stabilizer 22 shown in block format receives power on input terminal 26 from power bus 14 through fuse 24. The output of the power stabilizer is available on output terminal 28. An electrical load requiring stabilized power from the system of the invention is connected to output terminal 28. As shown in FIG. 1, an electronic engine monitor 30 is connected to output terminal 28 of the power stabilizer 22. The electronic engine monitor 30 is an example of an electrical load that can benefit from the effects of stabilized power available from the output terminal 28.

Additionally, engine starter 32 is connected via starter contactor 34 to the main power bus 14. When engine starter 32 is energized by the starter contactor 34 becoming conductive, starter current is drawn from the storage battery 12 through master contactor 16, main power bus 14 and starter contactor 34. The resulting current flow causes the voltage available on the main supply cable to drop in magnitude. The main bus supply voltage is provided directly to the electrical loads 18a,b,c. However, the reduced main bus voltage is not directly presented to electronic engine monitor 30. Rather, the main bus supply voltage is presented to the power stabilizer 22 which ensures the voltage delivered on output terminal 28 to electronic engine monitor 30 remains approximately at the nominal bus voltage value, for example, twelve volts. During conditions of sagging or reduced input voltage, power stabilizer 22 has a boosting effect that raises the voltage available on its output terminal 28 up to a nominally preset value.

Figure 2:
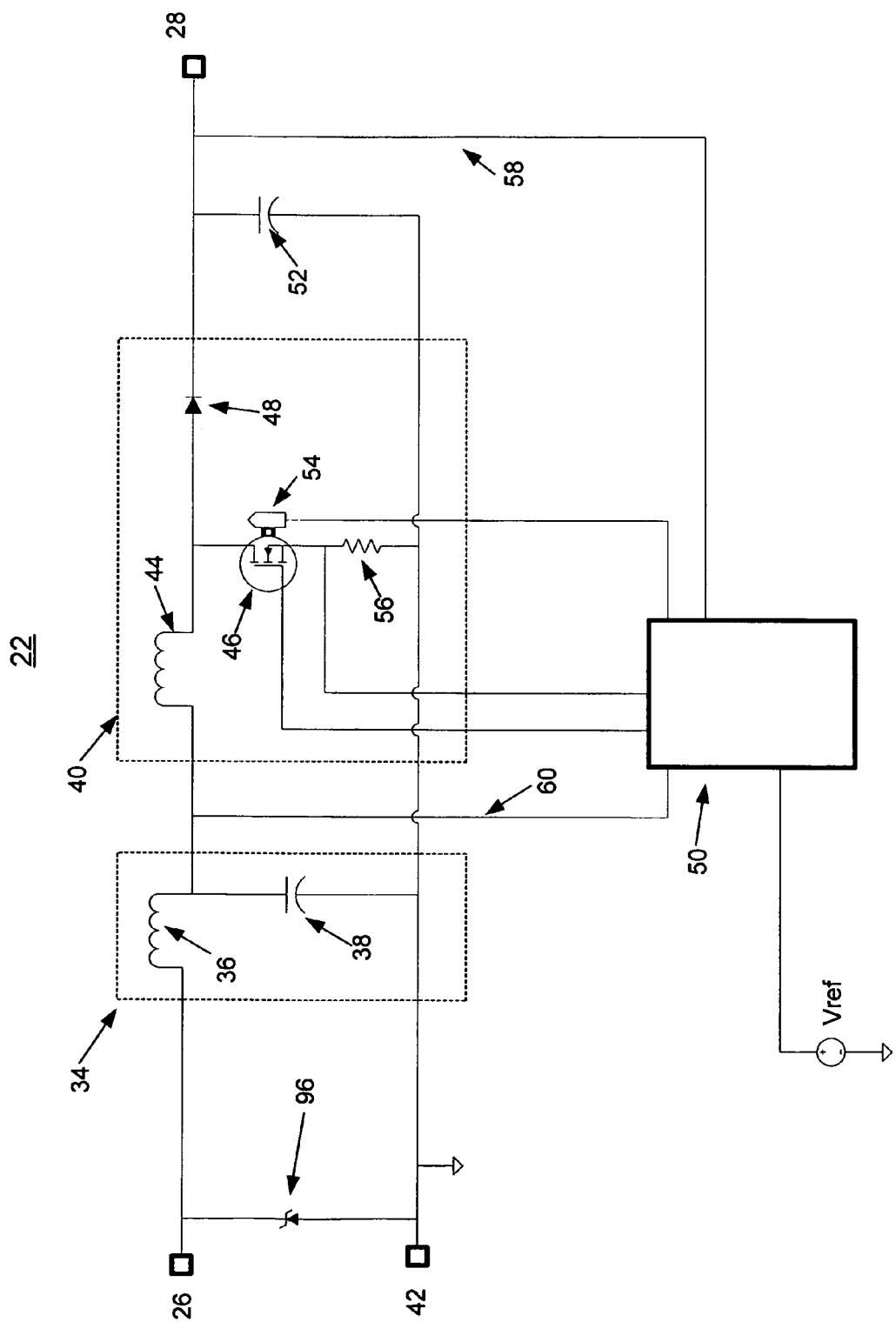
FIG. 2 is block diagram of the system of the invention.

Power stabilizer 22 of the invention is shown in greater detail in FIG. 2. Power stabilizer 22 is formed from a power converter circuit, which may be implemented through a boost converter topology, along with associated primary and secondary control circuits. These systems are explained by way of example as follows. Power stabilizer 22 has input terminal 26 for connection to a source of input power which may have a range of DC voltages. Power stabilizer 22 has an output terminal 28 for connection to an electrical load. The electrical load may require a DC voltage which has a more narrow operating range of values than is available from the input power source. Input terminal 26 receives input power into the power stabilizer 22. Power is delivered through an EMI (electro-magnetic interference) network 34 to the power converter circuit. EMI network 34 may be comprised of an inductor 36 and capacitor 38, which provides a system that reduces high frequency currents from propagating out through the input terminal 26. Additionally, the capacitor 38 of the EMI network provides a low impedance source of current to the boost converter circuit 40. The EMI network may be preceded with a transient voltage limiting device such as transorb 96. For a nominal twelve volt based system, transorb 96 may be selected to have a clamping voltage of approximately fifteen volts. This value will prevent potentially harmful voltage transients presented on input terminal 26 from damaging the boost converter circuit 40 and further prevent transient voltages from propagating through to the output terminal 28 thereby affording protection of the connected electrical load. Power from the EMI network 34 is delivered to the boost converter circuit 40. The voltage on capacitor 38, on average, varies with the input voltage provided on input terminal 26 with respect to ground terminal 42. The boost converter circuit 40 includes an inductor 44, a main power transistor such as mosfet (metal oxide semi-conductor field effect transistor) 46, and a diode 48. This configuration of components in the boost converter circuit 40 is designed to create a boosting effect. Notably, other power converter circuit topologies may be implemented to achieve a boosting effect on the system output with respect to the input. The flyback or forward converter circuit topology may be configured to raise the output voltage with respect to the input voltage. The voltage on output terminal 28 will be boosted above the voltage on input terminal 26 with respect to ground terminal 42. This boosting effect occurs as mosfet 46 is switched on and off by control circuit 50. When mosfet 46 is turned on, current flows from the EMI network 34 through inductor 44. When mosfet 46 is turned off, the current flowing through inductor 44 continues to flow and is delivered through diode 48 into the output capacitor 52. Since inductor 44 is connected through diode 48 to output capacitor 52, the output voltage is always at least equal to or greater than the input voltage minus one diode drop voltage. Any regular periodic switching of mosfet 46 will cause current flow through inductor 44. The current flow through inductor 44 causes the output voltage on output terminal 28 to rise above the input voltage on input terminal 26.

Figure 4:
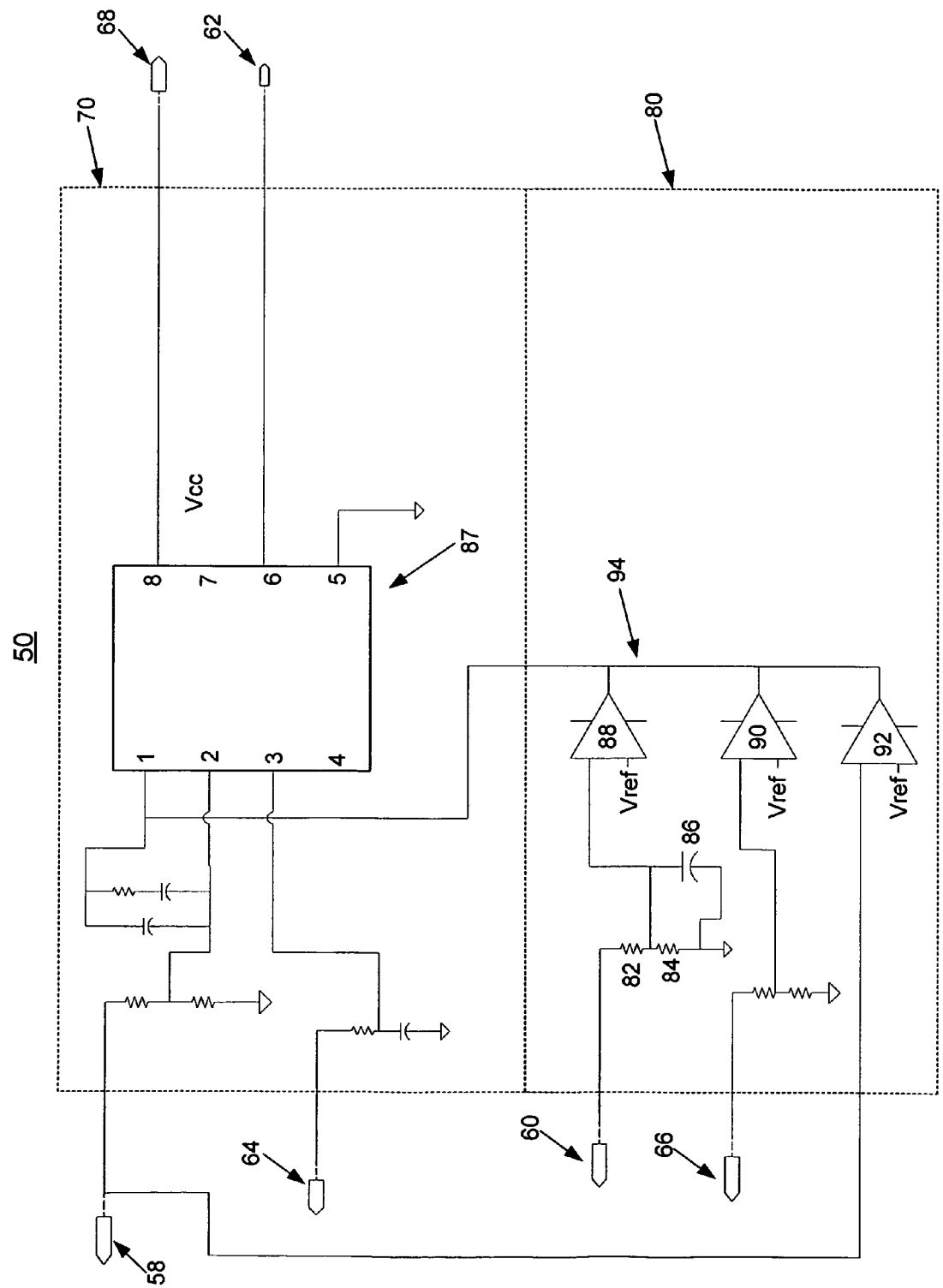
FIG. 4 is a partial schematic of the primary and secondary control circuit of the invention.

Control circuit 50 may comprise a primary control circuit 70 and a secondary control circuit 80. The control circuit 50 is shown in further detail in FIG. 4. The example circuitry shown in FIG. 4 is presented to explain the functionality of the primary and secondary control circuits. When mosfet 46 is in the conductive state, current flowing through inductor 44 passes through mosfet 46 and current sense resistor 56. The current flowing through resistor 56 provides a representative control signal on line 64 regarding the mosfet 46 current to the control circuit 50 and specifically to the primary control circuit 70. Control circuit 50 provides control signals on line 62 to the gate of mosfet 46 to control the conductivity of the mosfet 46. Those signals are at least based on the magnitude of the signal derived from current sense resistor 56. Control circuit 50 additionally receives a signal from the voltage on output capacitor 52 on line 58. This signal may be used by the primary control circuit 70 as well as secondary control circuit 80. The signal on line 58 provides information to control circuit 50 which is additionally used to control the conductivity of mosfet 46 and thereby control and regulate the output voltage available on output terminal 28 of power stabilizer 22 to minimum pre-selected value.

The power stabilizer 22 is considered to be in a standby mode when the voltage available on the output terminal 28 is at or above a pre-selected value for a given input voltage condition. In this mode, the control circuit 50 recognizes that the voltage on the output terminal satisfies a minimum required voltage for a specific voltage present on the input terminal 26 and prevents the mosfet 46 from being conductive in a cyclical fashion. In the standby mode the voltage available on the input terminal 26 is passed through inductor 44 and diode 48 to the output terminal 28 without any boosting effect. The standby mode occurs when the voltage on the input terminal 26 rises to about one diode drop (approximately 0.5 volts) above the set-point voltage selected for the output voltage on the output terminal 28.

The power stabilizer 22 is considered to be in operate mode when the voltage on the input terminal 26 is less than the set-point voltage selected for the output voltage on output terminal 28. The control circuit 50 recognizes this condition and controls the mosfet 46 to have alternate states of conductivity to cause a boosting effect of the voltage available on the output terminal 28, as previously described. In the operate mode, power stabilizer 22 actively controls the voltage on the output terminal 28 to be regulated at pre-selected value for example approximately 12 volts, while the voltage on the input terminal 26 may take on values between approximately 4 to 12 volts. If the voltage on input terminal 26 rises above the set-point voltage of 12 volts the control circuit 50 will drive the system into standby mode. During standby mode, the voltage on the input terminal 26 may take on values from 12.5 to 15 volts, for these conditions the voltage on the output terminal 28 will take on corresponding values of approximately 12 to 14.5 volts.

Control circuit 50 additionally may receive a signal regarding the magnitude of the input voltage on line 60. This signal may be used by either the primary or the secondary control circuit. This signal may be used to affect the conductivity of the mosfet 46, and thereby control the magnitude of the output voltage on output terminal 28. For example, if the magnitude of the input voltage rises above a predetermined value, the mosfet 46 may be rendered non-conductive so as to prevent the output voltage available on the output terminal 28 from being boosted above the input voltage value. Further, if the magnitude of the input voltage falls below a predetermined value, the conductivity of the mosfet 46 may be altered to adjust the boosting effect that the boost converter circuit 40 has on the output voltage available at the output terminal 28. When the input voltage available on input terminal 26 falls below a predetermined level it may be necessary to discontinue the boosting function of the power stabilizer 22 because the input current flowing in to the input terminal 26 rises as the input voltage falls. This effect is due to the constant power nature of the system. The power stabilizer 22 provides relative constant output voltage to a connected load and thereby provides constant power to a given connected load, regardless of the input voltage. At very low input voltages, the corresponding input current may be very large to satisfy the output power requirement. It may be necessary to protect the system from damage due to overheating caused by very large input currents. For example, in a system delivering five amps of output current at an output voltage of twelve volts, the system is providing sixty watts of output power. For a power stabilizer 22 having a power efficiency of 90%, the corresponding input power would be sixty-six watts. For a system input power of sixty-six watts, and an input voltage of four volts, for example, the corresponding input current would be 16.5 amps. If the actual components used to construct power stabilizer 22 were not able to handle this current level the control circuit 50 may disable further operation of the boost converter circuit 40, thereby preventing damage to the components.

As shown in FIG. 4 the feature of discontinuing operation below a predetermined input voltage is shown in further detail. Notably, it is a goal of the invention to provide a regulated nominal output voltage even when the input voltage to the power stabilizer 22 receives significant voltage excursions on the input terminal 26. Traditional power converters typically have an under-voltage lock-out value that is selected to prevent damage to the converter. The lock-out value typically is selected at a fixed value at which the converter can operate continuously without damage to its components. The power converter of the invention may be required to operate at very low input voltages, for example when an engine is being started. These conditions, however, are characterized as being relatively short in duration, but significant in depth with respect to the voltage excursion on the power bus. For example, most engine starting events last on the order of ones of seconds, however, they may cause the input supply power bus voltage to sag by a factor of two or three. Power bus supply voltage, during engine starting, of four to six volts is not uncommon on a nominal twelve volt system. To take advantage of this characteristic, the system shown in FIG. 4 has a network comprised of resistors 82 and 84 and capacitor 86 providing time delayed signals to voltage comparator 88. This network has a long time constant of approximately two seconds. This enables the system to respond to the time-voltage product of the input voltage presented on line 60, rather than just a fixed voltage as done in traditional converters. This feature allows the converter of the invention to operate on a short term basis at input levels substantially lower than it might be capable of operating over a long duration. This advantageously allows the components of the power stabilizer to be selected smaller than would be normally required for continuous operation at the minimum input voltage.

As shown in FIG. 4 the voltage present on line 60 is divided down by resistor 82 and resistor 84 and delayed by the time constant established by capacitor 86 and the resistors 82 and 84. The delayed and divided voltage on capacitor 86 is presented to voltage comparator 88 which acts as a threshold detector. When the voltage on line 60 falls below the Vref voltage, which is a threshold value, the comparator 88 creates a control signal on its output on line 94. The control signal on line 94 is sent to pin 1 of the control chip 87 and may override the main power transistor switching action being directed by control chip 87. An example of a suitable control chip, the UC2843A, is commercially available from Texas Instruments Co., Inc. The control signal from the secondary control circuit 80 causes the primary control circuit 70 to discontinue switching operation of mosfet 46, thereby shutting down the power converter operation.

The mosfet 46 of FIG. 2. is shown with a temperature detector 54 mounted in close proximity, and thereby is in thermal relation with mosfet 46. A signal on line 66 from the temperature detector may be used by control circuit 50 to determine if the conductivity of mosfet 46 should be alerted to avoid overheating. Overheating of mosfet 46 may be due to over current conditions resulting from too much connected load on the output of the power stabilizer 22 or prolonged operation with substantially reduced input voltages and thereby associated substantially increased input current. The signal on line 66 may be presented to the secondary control circuit 80 for processing by voltage comparator 92 as seen in FIG. 4.

Figure 3:
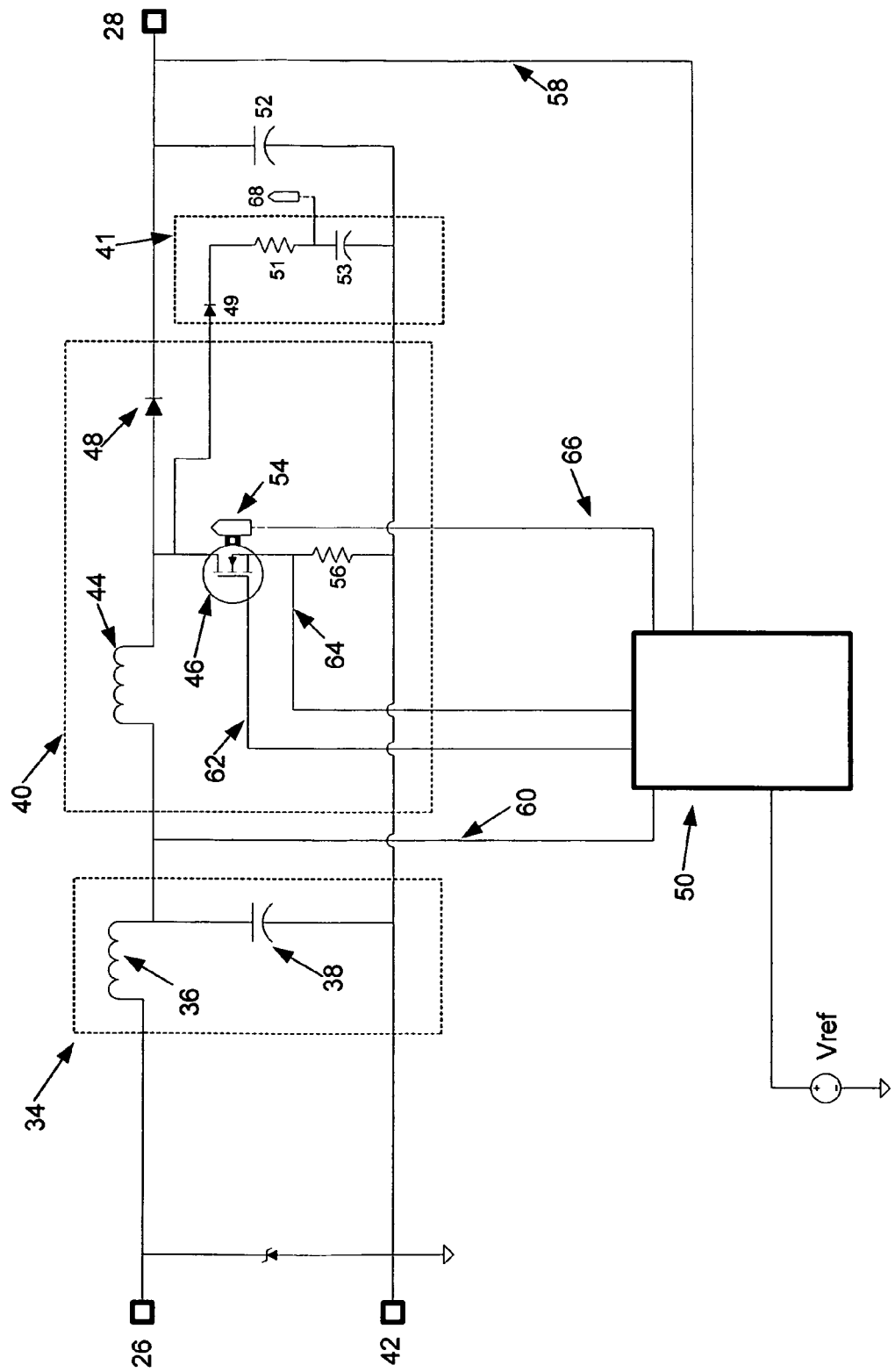
FIG. 3 is a block diagram of the control system of the invention.

The power stabilizer 22 may additionally contain an internal power supply circuit 41 as shown in FIG. 3. This circuit has an additional benefit beyond providing power to the associated control circuitry of FIG. 4. The power supply circuit of this invention not only provides the necessary power to operate the control circuitry of the power stabilizer 22, but is additionally responsive to the load connected to the power converter. The load responsive nature of the internal power supply 41 provides an additional measure of operationally robustness for the converter.

Power converters typically require an internal power supply to provide operation of various control circuits. These internal power supplies are often derived from a resistive dropping circuit from the input of the power converter and are often additionally supplied from a boot-strap winding on a power converter transformer. Traditional circuits usually are post regulated by a zener diode or a three terminal regulator circuit. These circuits tend to provide a stable internal power supply voltage over a wide range of input voltages.

The internal power supply circuit 41 of the system of the invention is supplied instead with the switched voltage waveform available on the drain terminal 55 of mosfet 46. This switched voltage is fed through diode 49 into the integrating circuit comprised of resistor 51 and capacitor 53. Notably, the average voltage available on drain terminal 55 is not solely related to the input or output voltage but rather to a combination of the input voltage, output voltage and the current drawn by the connected load from the power stabilizer 22 on terminal 28. This sensitivity to load current comes from the fact that the voltage duty-cycle on drain terminal 55 is related to the connected load current. This variable average voltage feeding the integrating circuit produces a variable voltage on the Vcc terminal 68. This variable voltage on the Vcc terminal 68 is provided to the control circuit 50 to power the associated control electronics. The voltage on drain terminal 55 is generally positively related to the input voltage available on terminal 26 and positively related to the output voltage on terminal 28 of the power stabilizer 22 and negatively related to the output current of the power stabilizer. As the input voltage goes down so does the voltage on the Vcc terminal 68. For a fixed input voltage, as the current supplied by the power stabilizer 22 increases, the voltage on the Vcc terminal 68 goes down. This characteristic is useful in further protecting the converter from overload conditions as well as prolonged under-voltage conditions.

The voltage on Vcc terminal 68 provides a source of power to operate the control circuit 50. Vcc terminal 68 is connected to the Vcc terminal of the control chip 87. This control chip 87, as with many IC controllers for switch mode power supplies, has an under-voltage lock out threshold. As an example, a UC2843A has an under-voltage lock out with the following characteristics. When the voltage on this terminal rises above 8.4 volts, the IC allows operation of the attached mosfet 46, when the voltage falls below 7.6 volts, the operation of mosfet 46 is discontinued. This operating characteristic, coupled with input voltage and output current sensitivity of power supply circuit 41, enables an additional measure of operational robustness to the power stabilizer 22. The under-voltage lock out feature of the control IC therefore becomes responsive to low input voltages as well as excessive output currents. The system can advantageously provide improved performance over traditional converters because the actual threshold for low input voltage operation can dynamically be alerted by the value of the attached load to the converter. In a traditional power converter the under-voltage lock-out level associated with an integrated circuit controller would be sized to have a specific value. For example, by the selection of a transformer turns ratio or a resistor voltage divider, the power supply voltage for the integrated control chip would be set to a fixed fraction of the input voltage. For example, if the system were set up using the above mentioned UC2843A and a ratio of 4:7.6 was implemented, then when the voltage on the input of the converter reached 4 volts, the power supply voltage available to the integrated circuit would reach 7.6 volts. Below this value the integrated circuit would shut off the converter regardless of the load conditions or the duration of the voltage excursion on the input below the 4 volt level. In contrast, the system of the invention dynamically considers the input voltage level and duration as well as the load connected to the output of the converter in determining whether an under-voltage lock-out condition should occur. Table 1 shows an exemplar set of component values for the construction of a converter according to the invention capable of providing 4 amperes of output current over a range of input voltages from 4 to 15 volts with a pre-selected output voltage of 12 volts. The converter would be operated at approximately 100 kHz as set by the timing resistor and capacitor connected to the UC2843A control chip. For a system built with these component values, the minimum input voltage of 4 volts may be for continuous operation, however, transients of input voltage down to approximately 2 volts may be sustained for up to approximately ½ a second without the converter shutting down.

TABLE 1

| Component | Value |
|---|---|
| inductor 44 | 23 uH |
| resistor 56 | 10 mOhms |
| resistor 51 | 10 ohms |
| capacitor 53 | 470 uF |
| capacitor 52 | 15 mF |
| mosfet 46 | IPB04N03 |
| diode 48 | MBRD835LG |
| contro chip 87 | UC2843A |
| resistor 82 | 300 k ohm |
| resistor 84 | 20 k ohm |
| capacitor 86 | 100 uF |
| comparator 88 | LM339 |
| inductor 44 | 23 uH |

The dynamically changing low input voltage operation of the present invention advantageously allows for smaller and lighter converter designs as compared to fixed threshold based systems. Smaller and lighter converters are particularly valuable in the aviation related applications.

This invention has been described by way of example and specifically demonstrated through the use of a boost converter topology, however, it may utilize other converter topologies such as the flyback or forward converter topologies. One of skill in the art will appreciate that the control methods and circuits described above are applicable and useful with other power supply converter topologies. The examples provided and discussed are not limiting and provide one of skill in the art an appreciation for the invention as particularly pointed out in the appended claims.

The invention claimed is:

1. An electronic control system comprising:
a boost converter circuit having:
an input for receiving a first DC voltage from a source of power,
an output for delivering a second DC voltage to a load, and
a main power transistor;
a primary control circuit providing a first control signal to control the conductivity of the main power transistor, wherein the first control signal from the primary control circuit effects the maximum allowable current flowing in the main power transistor; and
a secondary control circuit having a temperature detector, wherein the secondary control circuit provides a second control signal for overriding the first control signal of the primary control circuit, and wherein the temperature detector is mounted in thermal relation to the main power transistor, and wherein the secondary control circuit is capable of reducing the maximum current flowing in the main power transistor based on a third signal received from the temperature detector.

2. The electronic control system of claim 1 wherein the boost converter circuit further comprises an inductor and a diode,
wherein the inductor and diode are connected to the main power transistor, and wherein the temperature detector is mounted in thermal relation to the inductor and diode.

3. An electronic control system comprising:
a power converter circuit having:
an input for receiving a variable DC voltage from a power source,
an output for delivering a nominally fixed DC voltage to a load, and
a power transistor for converting the variable DC voltage from the input to the nominally fixed DC voltage on the output; and
a control circuit having a selectable time constant, wherein the control circuit controls the conductivity of the power transistor, and wherein the control circuit is responsive to the amplitude and duration of the variable DC voltage on the input, and wherein the control circuit causes the conductivity of the power transistor to vary based on both the amplitude and the duration of the variable DC voltage on the input.

4. The system of claim 3 wherein the selectable time constant is approximately two seconds.

5. The system of claim 3 wherein the control circuit further comprises a threshold detector having a threshold value for responsive detection that the magnitude of the variable DC voltage on the input is below the threshold value for a duration longer than the selectable time constant.

6. The system of claim 3 further comprising a second control circuit connected to the power transistor, wherein the second control circuit is responsive to the average value of the voltage available across the power transistor, and wherein the second control circuit provides signals that effect the conductivity of the power transistor.

7. The system of claim 3 further comprising a transient voltage limiting device connected to the input of the power converter wherein the transient voltage limiting device protects the power converter and the load connected to the output of the power converter from transient over voltage conditions.

8. An electronic control system comprising:
a power bus,
a battery having a battery voltage, and
a separate power source having a power source voltage,
the separate power source being connected to the battery in a parallel connection,
wherein the power bus is formed by the connection of the battery and power source and has an associated first voltage when the battery voltage is greater than the power source voltage and has an associated second voltage when the power source voltage is greater than the battery voltage; and
a boost converter circuit comprising:
an input for receiving the associated voltage on the power bus, and
an output for delivering a DC voltage to a load, and a control circuit having a selectable time constant wherein the control circuit is responsive to the amplitude and duration of the associated voltage received by the input, and wherein the DC voltage delivered from the output is substantially equal to the value of the second voltage regardless of whether the associated voltage on the power bus is equal to the first or the second voltage.

9. The electronic control system of claim 8, wherein the first voltage is in the range of 4 to 12 volts.

10. The electronic control system of claim 8, wherein the second voltage is in the range of 12 to 15 volts.

11. The electronic control system of claim 8 wherein the boost converter circuit further comprises a power transistor, an inductor and a diode, wherein the power transistor is coupled to the inductor and the diode, and wherein the inductor is coupled to the input and the diode is coupled to the output, and wherein the control circuit controls the conductivity of the power transistor, the system having an operate mode and a standby mode, and wherein in the operate mode the switching of the power transistor causes current to be conducted through the inductor and delivered through the diode to the output; and wherein in the standby mode the power transistor is non-conductive.

12. The system of claim 11, wherein the control circuit is responsive to the duration and magnitude of the associated DC voltage received on the input of the boost converter for selection of the standby mode or operate mode.

13. The system of claim 12, wherein the system is in the standby mode rendering the power transistor non-conductive when the power bus is characterized by having the second voltage value.

14. The system of claim 12, wherein the system is in the operate mode when the power bus is characterized by having the first voltage value.

15. An electronic control system comprising:
a power converter circuit having:
an input for receiving a first DC voltage from a source of power,
wherein the first DC voltage is variable,
an output for delivering a second DC voltage to a load, wherein the second DC voltage is nominally fixed,
and wherein the load draws a corresponding DC current from the output, and,
a power transistor for converting the first DC voltage applied to the input into the second DC voltage available on the output;
a control circuit coupled to the power transistor for controlling the conductivity of the power transistor over a range of duty cycles, the range of duty cycles being directly related to the magnitude of DC current drawn by the load,
an internal power supply coupled to the power transistor and the control circuit for providing a power supply voltage to the control circuit, the internal power supply responsive to the magnitude of the second DC voltage on the output and to the duty cycle of the power transistor, and wherein the power supply voltage is positively related to the magnitude of the second DC voltage and inversely related to the magnitude of the DC current drawn by the load.

16. The electronic control system of claim 15 wherein the control circuit further comprises a voltage threshold circuit having a threshold value, the voltage threshold circuit coupled to the internal power supply, the control circuit causing the power transistor to be non-conductive when the power supply voltage is below the threshold value.

17. The electronic control system of claim 15 further comprising a temperature detector mounted in thermal relation with the power transistor,
the temperature detector providing signals to the control circuit for altering the conductivity of the power transistor.

18. A process for controlling a DC voltage to a load comprising:
connecting the input of a power converter circuit to a power bus,
the power bus comprising a parallel connection of a battery and a separate power source,
the battery having a battery voltage,
the separate power source having power source voltage,
the power bus having an associated first voltage when the battery voltage is greater than the separate power source voltage, and
the power bus having an associated second voltage when the power source voltage is greater than the battery voltage,
connecting the output of power converter circuit to an electronic load,
disabling the output of the power converter circuit after a selectable time period based on the magnitude and duration of the associated voltage on the power bus,
providing a substantially fixed output voltage on an output of the power converter circuit to the electronic load,
wherein the output voltage on the output of the power converter is substantially equal to the second voltage regardless of whether the power bus is characterized as having the first voltage or the second voltage.

* * * * *